Patented Dec. 24, 1929

1,740,573

UNITED STATES PATENT OFFICE

EDWIN POTTER CARPENTER, OF HORLEY, ENGLAND, ASSIGNOR TO AMERICAN MACHINE & FOUNDRY COMPANY, A CORPORATION OF NEW JERSEY

PROCESS OF MAKING PLASTIC COMPOSITIONS

No Drawing.   Application filed July 7, 1927. Serial No. 204,151.

This invention relates to a process of making a plastic composition having casein as its base, and adapted for use in manufacturing articles of commerce in numerous arts.

In carrying the invention into effect, casein of commerce is first ground, preferably to a fineness of 60 mesh. Such casein usually contains from 3 to 5 degrees of acidity. After it is ground, water and hydrochloric acid are added to it to make a mixture of approximately 20 gallons of water and 50 lbs. of casein, and to raise the acidity to approximately 10 degrees.

The mixture, so made, is then subjected to the action of heat, preferably of approximately 140 F. to cause the casein to mat together and form a homogeneous plastic material. The casein begins to mat together at a lower temperature than 140 F., but the best results are obtained by heating it to approximately that degree.

After the mixture has been thus made and heated, it is repeatedly washed to remove impurities, the number of washings being dependent upon the nature of the composition desired, four being sufficient for opaque material and seven for transparent material. When transparent material is to be made, however, magnesium sulphate is added to the water in each washing to remove cloudiness, a fully saturated solution being most effective, though any solution above 20% may be used.

After the mixture has been thoroughly washed, it is then dried at a temperature of approximately 105 F.; and after it is so dried, it is reground, preferably to a fineness of 90 mesh.

After the material is thus reground, it is agitated and sprayed with water during its agitation, the amount of water added being approximately 25 lbs. to 100 lbs. of casein, when the composition is to be made in the form of rods from which articles of commerce are manufactured, and approximately 30 lbs. of water to 100 lbs. of casein when the composition is to be made in the form of sheets for the manufacture of articles of commerce.

The sprayed material is then allowed to stand until the moisture penetrates to the centre of each fine granule of casein, which usually requires approximately 18 hours.

After the material has thus become thoroughly impregnated with moisture, it is subjected to pressure and heat, as in a hydraulic press with steam-heated platens, to consolidate it, and to expel the moisture. Preferably, the material is put into the press while the platens of the latter are cold, after which steam is turned on the platens to heat them and through them the material. Then the platens are cooled before the material is removed to avoid warpage of the latter as it shrinks in cooling.

The consolidated composition is then cured by imersing it in formaldehyde and subjecting the whole to pressure to hasten the curing action.

What is claimed is:

1. The process of making a plastic composition which consists in grinding commercial casein to a fineness of 60 mesh, adding water and hydrochloric acid to make a mixture of 20 gallons of water and 50 lbs. of casein having an acidity of 10 degrees, heating the mixture to 140 F. to cause the casein to mat together and form a homogeneous plastic material, washing said material in a 20% to 100% solution of magnesium sulphate to remove impurities and cloudiness, drying the washed material at a temperature of 105 F., regrinding the dried material to a fineness of 90 mesh, spraying the reground material with 25 to 30 lbs. of water to 100 lbs. of casein and allowing the sprayed material to stand until the moisture penetrates to the centre of each granule of casein, and pressing the moist material and applying heat thereto during a part only of the pressing operation to consolidate the material and expel the moisture.

2. The steps in a method of making a plastic composition which consist in grinding commercial casein, adding water and hydrochloric aid to make a wet mixture of the proper consistency and acidity, heating the mixture to cause the casein to mat together and form a homogeneous plastic material, and washing said material in a 20% to 100% solution of magnesium sulphate to remove impurities and cloudiness and make the casein transparent.

3. The steps in a method of making a plastic composition which consists in adding water and hydrochloric acid to commercial casein to make a wet mixture of the proper consistency and acidity, heating the mixture to cause the casein to mat together and form a homogeneous plastic material, and washing said material in a 20% to 100% solution of magnesium sulphate to remove impurities and cloudiness and make the casein transparent.

4. The step in a method of making a plastic composition which consists in washing casein in a 20% to 100% solution of magnesium sulphate to remove impurities and cloudiness and make the casein transparent.

5. The step in a method of making a plastic composition which consists in washing homogeneous casein in a 20% to 100% solution of magnesium sulphate to remove impurities and cloudiness and make the casein transparent.

In testimony whereof, I have signed my name to this specification.

EDWIN POTTER CARPENTER.